United States Patent [19]

Werner

[11] 4,333,834
[45] Jun. 8, 1982

[54] DEVICE FOR DISPERSING A FLUID IN A LIQUID AND IN PARTICULAR OZONIZED AIR IN WATER

[75] Inventor: Brandin Werner, Montmorency, France

[73] Assignee: Trailigaz, Compagnie Generale de l'Ozone, Garges les Gonesee, France

[21] Appl. No.: 214,906

[22] Filed: Dec. 10, 1980

[51] Int. Cl.³ ............................................... C02F 1/74
[52] U.S. Cl. .................................. 210/219; 210/220; 261/87
[58] Field of Search ...................... 261/87, 85, 86, 88; 210/219, 220

[56] References Cited

U.S. PATENT DOCUMENTS

| | | | |
|---|---|---|---|
| 3,414,245 | 12/1968 | Frazer | 261/87 |
| 3,820,759 | 6/1974 | Hege | 261/87 X |
| 4,018,859 | 4/1977 | Müller | 261/87 |
| 4,263,143 | 4/1981 | Ebner et al. | 261/87 X |
| 4,297,214 | 10/1981 | Guarnaschelli | 210/219 |

Primary Examiner—Thomas G. Wyse
Attorney, Agent, or Firm—Sughrue, Mion, Zinn, Macpeak and Seas

[57] ABSTRACT

The device comprises a fluid supply tube immersed in the liquid to be treated. There are disposed coaxially with this tube: an induction enclosure connected to the lower part of the tube and provided with induction orifices for the liquid and means defining a centrifugal pump. The pump is connected to the lower end of the induction enclosure and is adapted to draw in the liquid entering the enclosure in such manner that this liquid itself draws in the fluid supplied by the supply tube, to form in the enclosure an emulsion of the fluid in the liquid and to project this emulsion toward the surrounding liquid.

Application in the treatment of drinking and waste waters.

4 Claims, 2 Drawing Figures

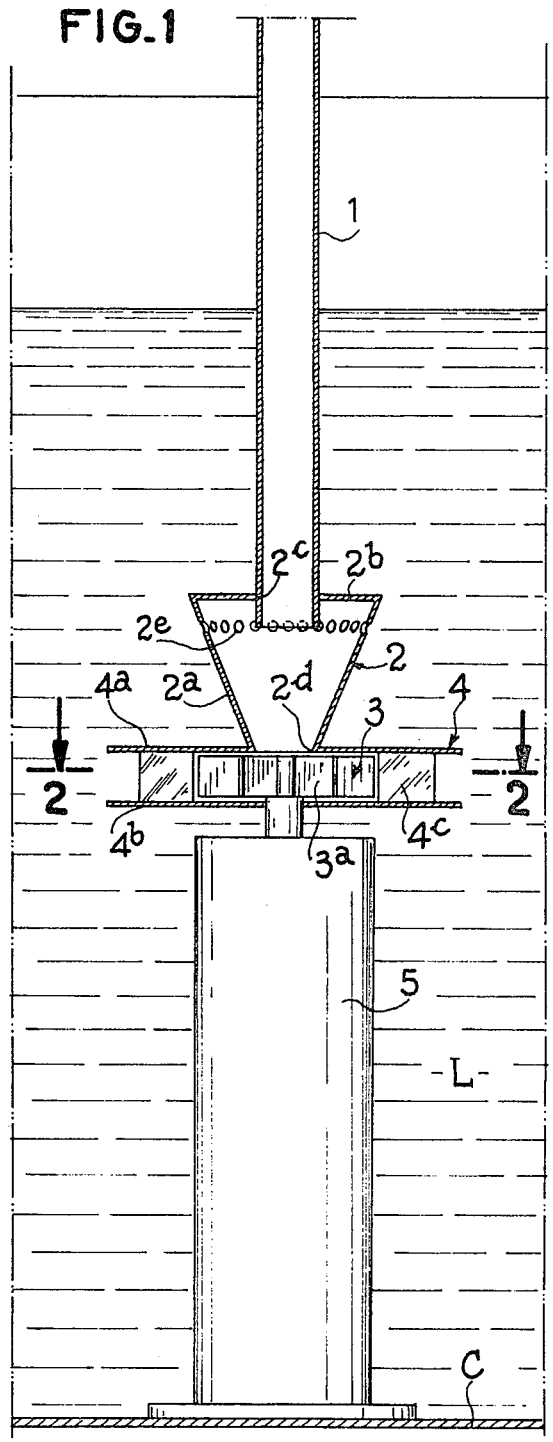
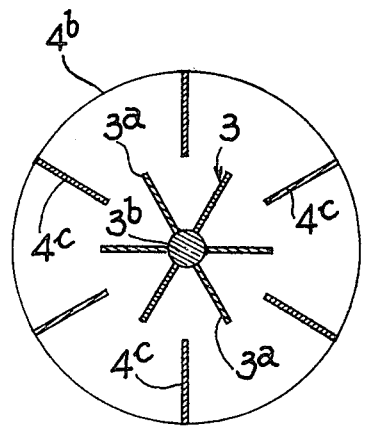

DEVICE FOR DISPERSING A FLUID IN A LIQUID AND IN PARTICULAR OZONIZED AIR IN WATER

DESCRIPTION

The present invention relates to a device for dispersing a fluid in a liquid and in particular for dispersing air containing a certain amount of ozone in water.

Such devices are known in which the ozonized air or other treating gas is introduced into a liquid contained in a tank by means of a vertical tube which extends from the upper surface of the liquid, a fan disposed in the upper part of the tube and injecting therein air under pressure, and a rotary distributor or diffuser disposed in coaxial relation to the tube in the lower part of the latter and driven in rotation by a motor.

Now, notwithstanding various improvements, these known devices do not ensure a sufficiently intimate mixture of the ozonized air and water and consequently a high yield of the use of the ozone.

An object of the invention is to overcome this drawback.

According to the invention, there is consequently provided a device for dispersing a fluid in a liquid, said device comprising a fluid supply tube immersed in the liquid and a induction enclosure connected to the lower part of the supply tube and provided with liquid induction orifices, and means defining a centrifugal pump connected to the lower end of the induction enclosure, said enclosure and pump being in coaxial relation to the supply tube, said pump being adapted to draw on the liquid entering the induction enclosure so that said liquid itself draws on the fluid supplied by the supply tube, to form in the enclosure an emulsion of the fluid in the liquid and to project said emulsion into the surrounding liquid.

Further features and advantages of the invention will be apparent from the ensuing description of an embodiment illustrated in the accompanying drawing in which:

FIG. 1 is a diagrammatic longitudinal sectional view of a device according to the invention, and FIG. 2 is a sectional view taken on line 2—2 of FIG. 1.

Such a device, which may be employed in particular for diffusing ozonized air in waste waters, is placed in a tank C containing the liquid L to be treated.

The device essentially comprises a vertical tube 1 immersed in the liquid L, an induction enclosure 2 connected to the lower part of the tube 1, a wheel 3 of a centrifugal pump rotatable inside a diffuser body 4, and an electric motor 5 which is drivingly connected to the wheel 3 of the centrifugal pump and normally rests on the bottom of the tank C. The motor 5 may be a sealed motor, a motor having an immersed rotor or any other motor capable of being immersed in a liquid.

The diffuser body 4 comprises two side walls 4a and 4b interconnected by fixed blades 4c which extend radially between the periphery of the side walls 4a and 4b and the periphery of the wheel 3 of the centrifugal pump. The wheel 3 is a conventional wheel of a centrifugal pump of suitable shape which comprises movable radial blades 3a carried by a shaft 3b driven in rotation by the motor 5.

The induction enclosure comprises a frustoconical wall 2a and a planar wall 2b forming the large base of the enclosure and provided with an aperture 2c in which there extends coaxially to a certain vertical extent the lower end portion of the supply tube. The end 2d of smaller diameter of the enclosure, which forms the small base of the latter, is open and connected to a centre aperture of the upper side wall 4a. The frustoconical wall 2a of the induction enclosure 2 comprises a number of induction orifices 2e which are evenly spaced apart on a circumference defined by a cross-section of the frustoconical wall 2a in the vicinity of the part of the latter of larger diameter substantially at the height of the lower end of the tube 1. However, the invention is not intended to be limited to such an arrangement of the induction orifices and any other suitable arrangement of these orifices whereby it is possible to draw in the liquid L toward the gas which, in operation, flows downwardly through the tube 1, may be employed, and in particular orifices disposed on the periphery of the upper wall 2b.

The device operates in the following manner:

When stationary, the diffuser body 4, the enclosure 2 and a part of the tube 1 are filled with the surrounding liquid L up to the level of this liquid.

When the motor 5 is provided with current, it drives the wheel 3. Owing to the centrifugal force, the liquid is drawn in at the centre of the wheel and expelled outwardly as in a centrifugal pump. The liquid in the tube 1 is evacuated and the gas is violently drawn in through the tube 1. The liquid is drawn in by way of the induction orifices 2e into the enclosure 2 and in turn draws in the gas through the tube 1. The induction or suction effect is the larger as the liquid height or head above the induction orifices is greater. A very violent whirling effect is produced inside the induction enclosure and this forms an emulsion of the gas in the liquid. This emulsion enters the wheel 3 and is ejected forcefully between the fixed blades 4c.

It will be understood that the induction orifices 2e must be small enough to create a depression in the induction enclosure 2. Consequently, the gas is expanded in the induction enclosure 2 and this permits an intimate mixture thereof with the liquid L drawn in by way of the orifices 2e, this mixture being thereafter compressed in the wheel 3 and ejected. It may moreover be assumed that it is this phenomenon which results in the superiority of the device according to the invention over the devices of the prior art in which the gas and the liquid are mixed in the diffuser, so that the gas, on the point of emerging, is sent under pressure into the liquid, which has an adverse effect on a good mixture.

It must be understood that the device according to the invention is not intended to the injection of ozonized air into a liquid but may be applied to other uses such as, for example, the mixture of two liquids having highly different flows or a liquid with a powdered product.

The device according to the invention has many advantages since it permits, in particular:

an easy assembly and handling owing in particular to its normal axial symmetry and to the existence of the supply tube extending beyond the surface of the liquid;

the induction of the gas under depression, and consequently at a high volume;

taking the liquid expanded gas mixture in the wheel where the whole of the mixture is under high pressure, whence an optimum effect of introduction of the gas into the liquid;

projecting the liquid gas under pressure mixture, which is consequently of a small volume, forcefully into the surrounding liquid;

varying within wide limits the value of the depression of the gas by varying the characteristics of the assembly comprising the wheel and the fixed blades and the characteristics of the induction enclosure, and varying within wide limits the force of projection of the mixture by varying the characteristics of the assembly comprising the wheel and the fixed blades and the characteristics of the induction enclosure.

Having now described my invention what I claim as new and desire to secure by Letters Patent is:

1. In a device for dispersing a fluid into a liquid, said device comprising a tank for receiving said liquid, an open-ended fluid supply tube extending into the tank for immersion in said liquid, and means defining a centrifugal pump coaxial with an end portion of the supply tube and communicating with the end portion of the supply tube by way of a centre inlet for projecting said fluid from the supply tube into said liquid surrounding the pump; the improvement comprising:

an induction enclosure interposed coaxially between and sealedly interconnecting the end portion of the supply tube and the pump inlet, the induction enclosure having a substantially frustoconical shape and a smaller end and a larger end and being connected to the pump inlet adjacent said smaller end and connected to the lower end portion of the supply tube adjacent said larger end, the end portion of the supply tube projecting into the enclosure but terminating short of the pump inlet, the enclosure defining liquid induction orifices adjacent said larger end of the enclosure, the orifices having a size which is small enough with respect to the flow through the pump to create a depression within the enclosure in operation of the device and thereby draw into the enclosure said fluid from the supply tube and said liquid through said orifices and form an emulsion of said fluid and said liquid, which emulsion is projected by the pump into said liquid in the tank.

2. A device according to claim 1, wherein the induction orifices are located substantially in a part of the enclosure between said larger end of the enclosure and a transverse plane of the enclosure which plane contains the open end of the supply tube within the enclosure.

3. A device according to claim 1, wherein the enclosure comprises a frustoconical wall and a transverse end wall defining said larger end of the enclosure, and the induction orifices are disposed adjacent an outer periphery of said transverse end wall.

4. A device according to claim 1, wherein said induction orifices are evenly spaced apart on a circumference defined by a cross-section of the frustoconical enclosure.

* * * * *